United States Patent [19]
Alshibani et al.

[11] Patent Number: 6,151,022
[45] Date of Patent: Nov. 21, 2000

[54] METHOD AND APPARATUS FOR STATICALLY TESTING VISUAL RESOURCES

[75] Inventors: Saud A. Alshibani, Issaquah; Rick A. La Plante, Redmond; Kenneth Ralph Walters, Mountlake Terrace, all of Wash.

[73] Assignee: Microsoft Corporation, Redmond, Wash.

[21] Appl. No.: 08/980,733

[22] Filed: Dec. 1, 1997

[51] Int. Cl.[7] .............................. G06F 13/00; G06F 17/24
[52] U.S. Cl. ................. 345/342; 707/536; 704/1
[58] Field of Search ................... 345/333, 116, 345/334, 352, 342; 707/508, 523, 527, 529, 536, 507, 509

[56] References Cited

U.S. PATENT DOCUMENTS

| | | | |
|---|---|---|---|
| 5,392,386 | 2/1995 | Chalas | 395/155 |
| 5,416,903 | 5/1995 | Malcolm | 395/155 |
| 5,493,639 | 2/1996 | Hirano et al. | 395/141 |
| 5,510,981 | 4/1996 | Berger et al. | 364/419.02 |
| 5,551,055 | 8/1996 | Matheny et al. | 395/882 |
| 5,579,223 | 11/1996 | Raman | 395/751 |
| 5,583,761 | 12/1996 | Chou | 395/798 |
| 5,664,206 | 9/1997 | Murow et al. | 704/8 |
| 5,797,011 | 8/1998 | Kroll et al. | 395/705 |
| 5,893,134 | 4/1999 | O'Donoghue et al. | 707/536 |

OTHER PUBLICATIONS

Kano, Nadine, *Developing International Software for Windows 95 and Windows NT,* (1995) Chapter 1 & 4, pp. 1–17, 115–147.

*Primary Examiner*—Raymond J. Bayerl
*Assistant Examiner*—David E. Brown
*Attorney, Agent, or Firm*—Leydig, Voit & Mayer, Ltd.

[57] ABSTRACT

Displayed inconsistencies and errors within a visual resource (e.g., dialog, menu) and between two visual resources are automatically detected without requiring the execution of an application having either of the visual resources. When a source application is localized, its visual resources are extracted and translated into the target language. This translation of the visual resources often causes errors in the visual display. The visual resource analyzer of the invention identifies these errors without requiring execution of either the source or localized versions of the application, which enables the errors to be easily corrected. Furthermore, the elements of a visual resource are analyzed for display anomalies, such as alignment errors and overlapping other elements.

27 Claims, 6 Drawing Sheets

```
BEGIN
for each visual resource element VRE₁
for each visual resource element VRE₂
if ( 0 < | XPosition(VRE₁) - XPosition(VRE₂) | < Δ_X ) then
Record potential alignment error in VRE₁'s X-Position
end if
if ( 0 < | YPosition(VRE₁) - YPosition(VRE₂) | < Δ_Y ) then
Record potential alignment error in VRE₁'s Y-Position
end if
next VRE₂
next VRE₁
END
```

FIG. 6A - Alignment Test

```
BEGIN
for each visual resource element VRE₁
for each visual resource element VRE₂
if (VRE₁ and VRE₂ overlap based on their sizes and positions) then
Record Overlapping of VRE₁ and VRE₂
end if
next VRE₂
next VRE₁
END
```

FIG. 6B - Overlap Test

```
BEGIN
if (Source and Target Visual Resources do not have the same number of
elements) then Record Dialog Initialization Error
end if
END
```

FIG. 6C - Dialog Initialization Test

```
BEGIN
Retrieve the Font type and size for the visual resource element
Retrieve the text string for the visual resource element
Get the size required for the text string using an Operating System function
if (the size of the text string is too large for the visual resource element)
  Record a Fit Error for the visual resource element
end if
END
```

FIG. 6D - Fit Test

```
BEGIN
for each visual resource element SVRE in the source visual resource SVR
if (the relative size or position of SVRE in SVR is not the same as
corresponding target visual resource element within the target
visual resource) then Record the change in the SVRE
end if
next SVRE
END
```

FIG. 6E - Visual Resource Element Consistency Test

METHOD AND APPARATUS FOR STATICALLY TESTING VISUAL RESOURCES

FIELD OF THE INVENTION

This invention relates to computer programming, and more particularly, to a framework and method for analyzing properties of visual resources to detect inconsistencies within a visual resource, or anomalies created during the localization process.

BACKGROUND OF THE INVENTION

The user interface of a software application distributed internationally requires several versions of its user interface to conform to local languages. The process of creating these different versions from a source version, which is typically an English language version, is called "localization." It is a rather involved process to translate the local language of an application into a different local or target language, especially while maintaining the same "look and feel" of the application. For example, it is desirable that visual resource elements maintain their same relative positions and sizes.

Localization requires more than a mere substitution of character strings in the visual resources (menus, dialog boxes, titles, toolbars, and the like) to convert from the source to a target language. For example, translated visual resources must be modified to account for varying lengths of the character strings representing a word or phrase which can change substantially between two languages. For instance, the length of text in a visual resource of an application often grows when it is translated from English to a different language. For example, the English word "Edit" becomes "Bearbeiten" in German, and "Sort Ascending" becomes "Lajittele nousevassa järjestyksessä" in Finnish. Deviation in lengths substantially complicates the localization process.

A vast majority of the problems associated with localized products are attributed to "visual bugs." These visual bugs include such things as overlapped controls, truncated text on a control, and alignment errors. To manually check each visual resource of an application converted to a target language requires extensive resources and is costly and time consuming. Current localization tools do not currently provide for immediate testing as individual visual resources are localized. Rather, the localized application must be executed, and then a user or a testing tool manipulates the menus and commands to display the visual resources for a human tester to visually inspect each visual resource and attempt to spot the errors. Even if all visual resources are viewed, slight alignment errors are difficult to detect. Furthermore, only the localized visual resources are displayed by a localized application so a direct comparison between the source and localized visual resources is not available. In addition, truncation bugs are particularly difficult to spot because the application's tester is quite often not fluent in the target language, and therefore, may not know if a few characters are not displayed.

SUMMARY OF THE INVENTION

According to the invention, an automated method and framework are provided for detecting visual anomalies between a source application and its corresponding localized application without requiring the localized or source application to be compiled or executed. In addition, this method and framework compares localized and source visual resources to determine any changes, especially those that deviate from the "look and feel" of the source visual resources. Hereinafter, the word "static" will be used to describe a state of an application in which it is not executing. The checking of visual resources in a static condition provides an easy means for exhaustively testing each localized visual resource. Conventional testing methods require extensive knowledge of the application and painstaking manipulation of the localized application at run time in order to display and scrutinize each and every visual resource. Moreover, by combining the invention disclosed herein with a program that performs the localization of a source application, immediate testing results can be provided as each translation is made. This provides a substantial time and cost savings as errors are immediately detected and corrected.

A visual resource analyzer having the foregoing features statically tests the properties and characteristics of the localized visual resources incorporating the target language, and reports errors and discrepancies. The visual resource analyzer receives as its inputs the visual resources of the source and localized applications and the tests to be performed on these visual resources. Examples of tests that may be performed by the visual resource analyzer include checking for alignment, overlap, dialog initialization and fit errors. Additionally, by comparing the display properties of the source and localized visual resources, the analyzer identifies elements of the visual resources whose positions or sizes have changed as a result of the localization process.

Alignment errors in a localized visual resource occur when one or more of the elements of the resource are not properly horizontally or vertically aligned with respect to other elements of the localized visual resource. By comparing the position of each resource element with the positions of other resource elements, those elements that are not in the same position but are within some small delta (e.g., a few pixel positions) can be identified as potential alignment errors.

Errors in a localized visual resource may also result from overlapping elements within the localized visual resource or other visual resources. By comparing the position and size of each element with that of the other elements of the localized visual resource, the overlapping visual resource elements can be identified by the visual resource analyzer.

Dialog initialization errors sometimes occur in a localized visual resource when a text string is provided to the visual resource at runtime. While the dynamic elements of a visual resource are not available before runtime, the visual resource analyzer can detect errors by performing a series of tests on the dialog initialization data of the visual resources. For example, the visual resource analyzer tests controls and list boxes to ensure the number of initialization strings are the same.

Fit errors occur, for instance, when a text string displayed in a localized visual resource does not fit within the allocated space on the user interface. The visual resource analyzer employs a standard function supplied by the operating system to determine the space needed to display the string based on the desired font type and size. The visual resource analyzer identifies fit errors by comparing the space required with the space available in the localized visual resource.

Using the disclosed methods and framework to perform tests where the visual resource analyzer has access to the source and localized visual resources, the localized visual resource can be readily analyzed for inconsistencies and errors with respect to both the localized visual resources and source visual resources from which the localized version is based. Furthermore, the visual resource analyzer may be configured to communicate with localization software to test changes immediately after they are made.

BRIEF DESCRIPTION OF THE DRAWINGS

The appended claims set forth the features of the present invention with particularity. The invention, together with its advantages, may be best understood from the following detailed description taken in conjunction with the accompanying drawings of which:

FIGS. 6A–6E present pseudo code for performing the visual analyzer tests illustrated in the flow diagram of FIG. 5.

DETAILED DESCRIPTION OF THE PREFERRED EMBODIMENT

Figure 1:
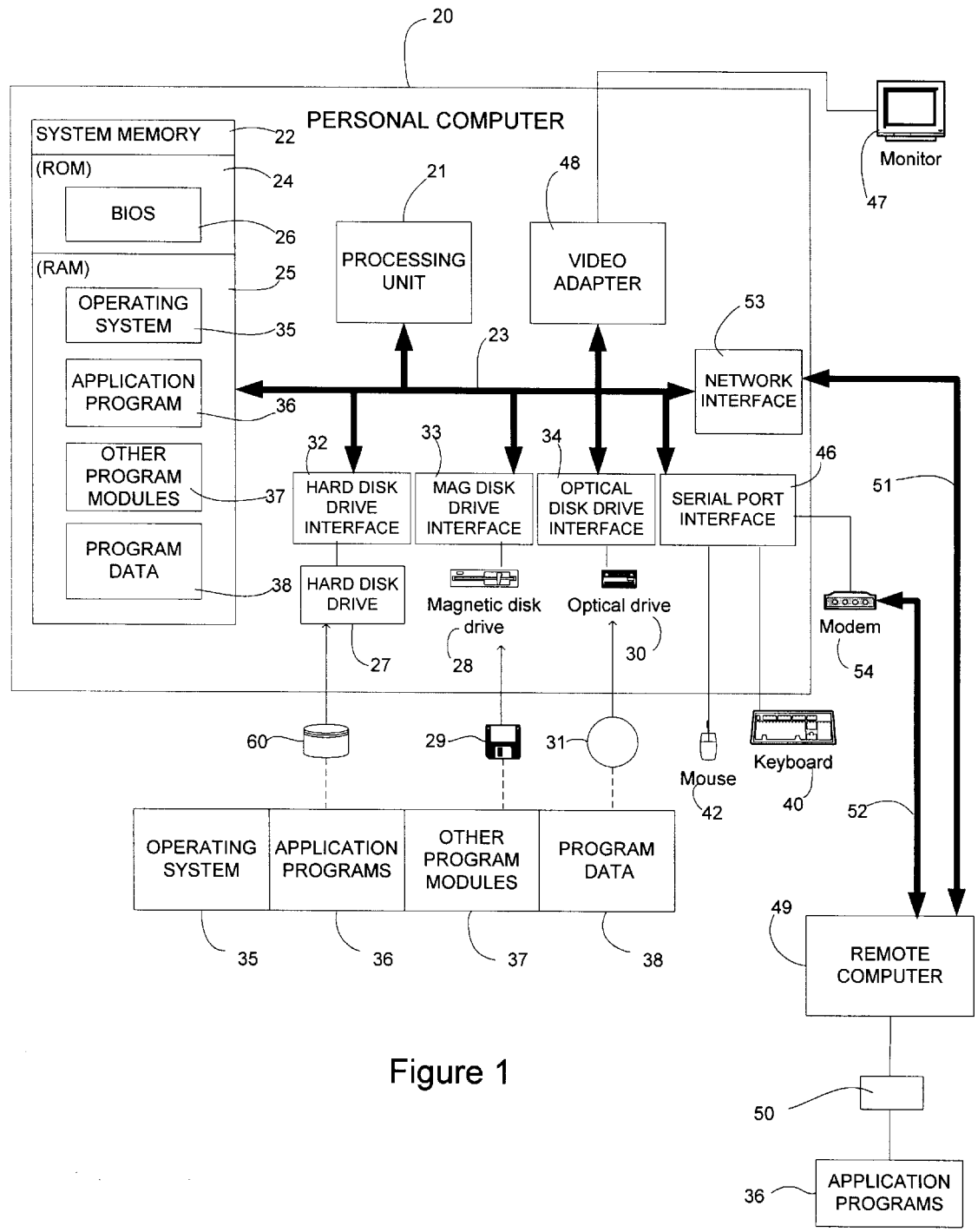
FIG. 1 is a block diagram of an exemplary operating environment in which the invention may be practiced, including a computer system for executing a visual resource analyzer in accordance with the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that helps to transfer information between elements within the personal computer 20, such as during start-up, is stored in ROM 24. The visual resource analyzer, stored in system memory 22, will be executed by processing unit 21. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be collected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2A:
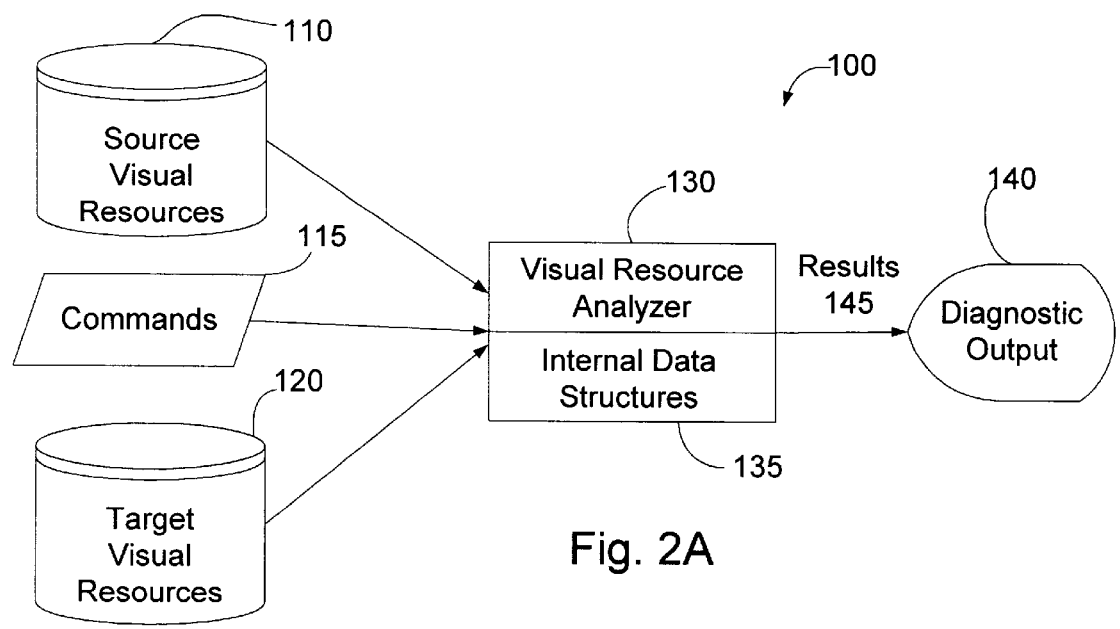
FIG. 2A is a block diagram of one embodiment of the visual analysis framework using the visual resource analyzer to test visual resources.
Figure 2B:
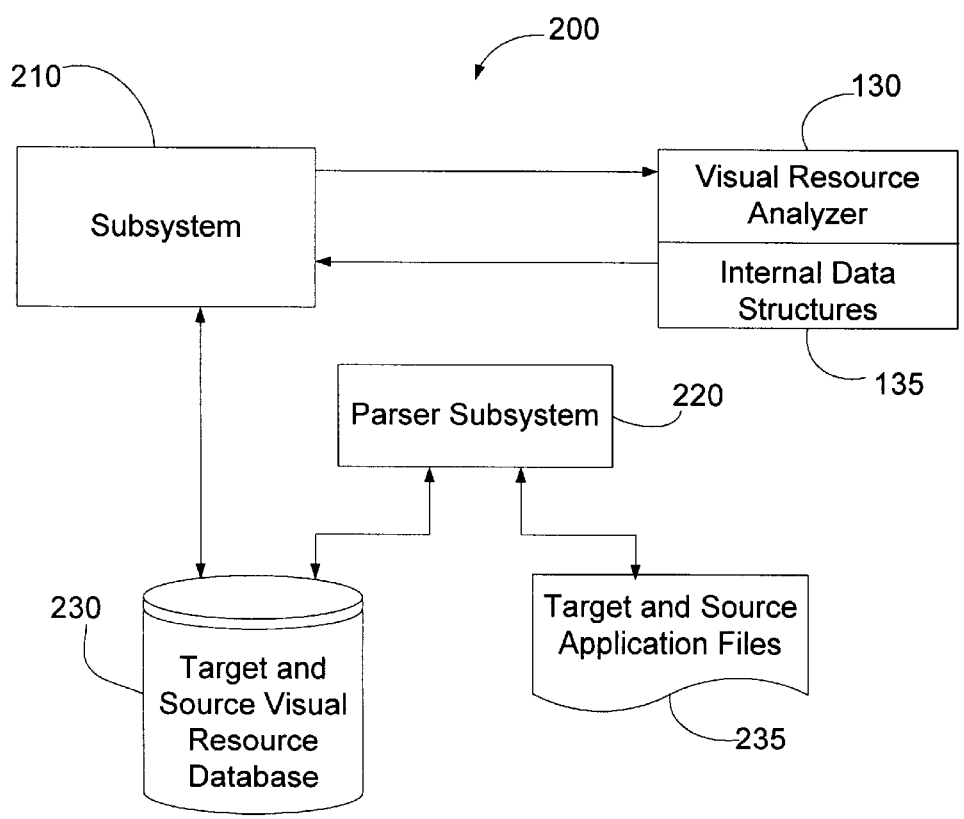
FIG. 2B is a block diagram of the visual resource analyzer incorporated into a software localization system.
Figure 3:
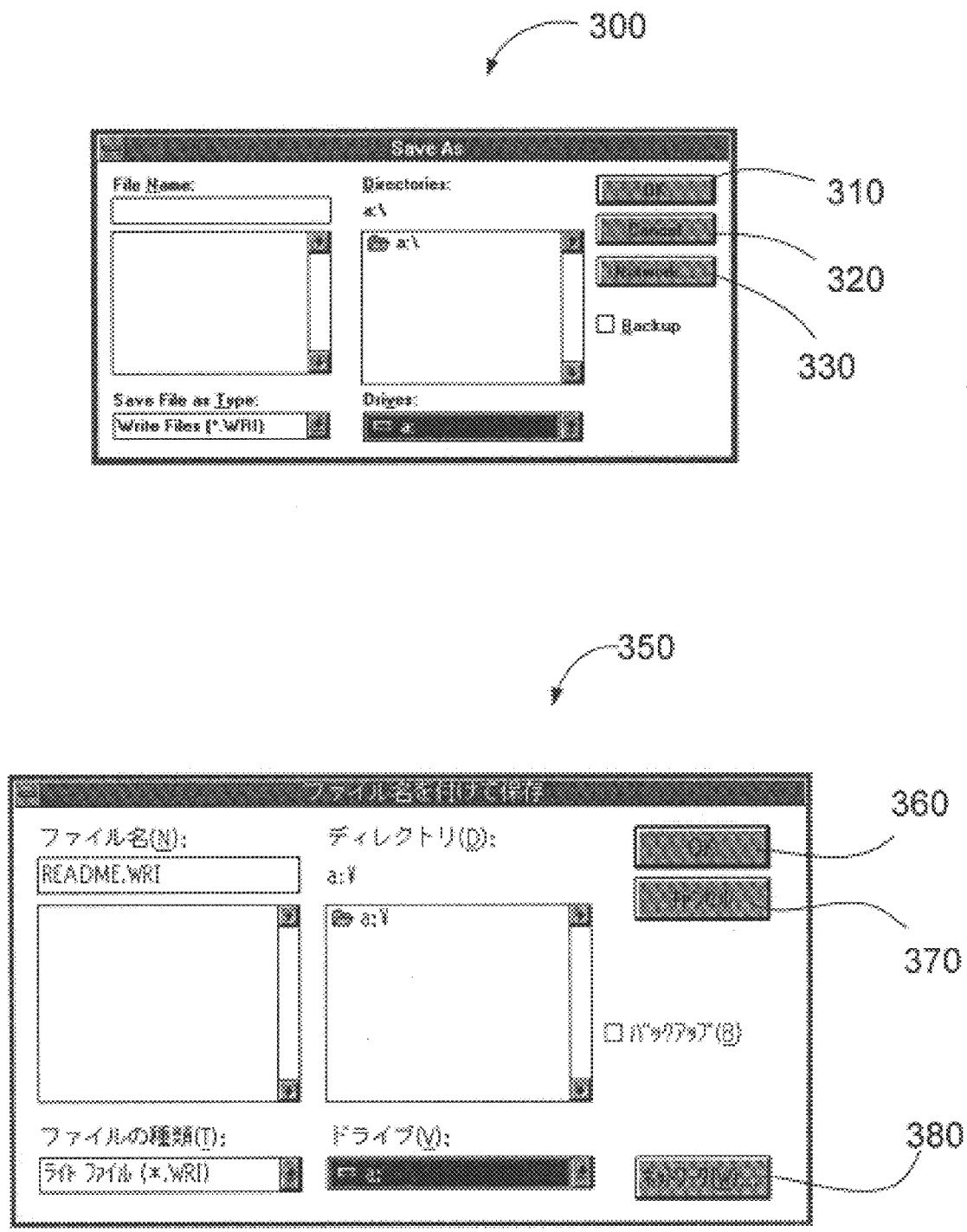
FIG. 3 illustrates exemplary English and Japanese versions of a "Save As" dialog box.

Before describing the block diagrams of FIGS. 2A and 2B and to aid in the understanding of the testing performed by the visual resource analyzer 130, FIG. 3 presents an exemplary English "Save As" dialog box (the source visual resource) 300, and a Japanese "Save As" dialog box (the target visual resource) 350. The sizes of dialog boxes 300 and 350 are different, partly due to the larger system font used for Japanese Windows NT 3.x. Elements 310, 320, and 330 of the English dialog box 300 correspond with elements 360, 370, and 380 of the Japanese dialog box 350. Due to the difference in size of the font and text strings, many of the elements of the target visual resource 350 need to be expanded and shifted, which can result in non-alignment, overlapping of elements, and text truncations. For instance, the left and right sides of elements 360, 370, and 380 are correctly vertically aligned. Should one of these elements be shifted slightly left or right, the visual resource analyzer 130 would detect an alignment error.

Turning now to FIG. 2A, shown is a block diagram of the visual resource analyzer framework 100 for testing visual resources by the visual resource analyzer 130. As indicated, the visual resource analyzer 130 receives as its inputs localized or "target" visual resources 120, the source visual resources 110, and commands 115. The commands 115 correspond to a set of tests to be performed on the target visual resources 120. The diagnostic output 140, produced by the visual resource analyzer 130, indicates the results of the operations performed in response to commands 115. The diagnostic output 140 could be in many different forms, including messages displayed on a monitor 47 (FIG. 1), sent to the program performing the localization translations, or written to a file stored on a hard disk drive 27, magnetic disk drive 28, and optical disk drive 30.

Source visual resources 110 and target visual resources 120 are presented to visual resources analyzer 130 which are converted to internal data structures 135 which the visual resource analyzer 130 can manipulate. In one embodiment of the present invention in the Windows environment, the source and target visual resources (110, 120) are presented in the standard Win32 binary resource format, which is described in "Win32 Binary Resource Formats", Microsoft MSDN CD 10, Microsoft Corporation (January 1995), which is hereby incorporated by reference. The source and target visual resources are then internally converted by the visual resource analyzer 130 and stored in C++ Microsoft Foundation Class (MFC) objects. MFC classes are described in Microsoft Visual C++ Version 5.0, Microsoft Corporation (1997), and in "MFC 4.2", Microsoft Developer Network Library Edition—October 1997, Microsoft Corporation (1997). Each of these references are hereby incorporated by reference. For instance, if the visual resource is a dialog, then a CDialogTemplateEx object, derived from the MFC CDialogTemplate object would be used. The CDialogTemplateEx object contains multiple CDialogItemTemplates, one to represent each control element in the dialog. The CDialogItemTemplate contains zero or one CDialogInitTemplates which contain control specific dialog initialization data. Included in this embodiment, the internal data structure 135 includes a data structure element identifying the type of visual resource (e.g., dialog, menu, control) for visual resources represented therein.

As the present invention is not limited to the Windows environment, the source and target visual resources (110, 120) could be presented in other formats, such as those native to other operating environments (e.g., Unix, Macintosh). Similarly, a multitude of formats could be used for internal data structures 135.

In another configuration which is shown in FIG. 2B, the visual resource analyzer 130 is incorporated into a software localization system 200. The software localization system 200 comprises an editor subsystem 210 and a parser subsystem 220. The editor subsystem 210 provides the localization editing functions and a graphical user interface which allow the user to localize a source application into a target application. The parser subsystem 220 parses the native file format (e.g., source or object code, or executable image) of the source and target application files 235 to extract the visual resources and to populate the application visual resource database 230 with the extracted visual resources (110, 120). The parser subsystem 220 can also insert the target visual resources stored in the application visual resource database 230 into the target application stored in the target and source application files 235 after the visual resources have been localized by the editor subsystem 210. In one embodiment of the present invention in the Windows environment, the parser subsystem 220 uses Win32 APIs (application programming interfaces) to extract visual resources from executable application files. These APIs are described in "Win32 APIs to Update and Extract Resources From PE Format Files", Microsoft Win32 SDK, Microsoft Corporation (1992), which is hereby incorporated by reference.

In the Windows environment, the editor subsystem 210 initiates a test by communicating via a Microsoft Component Object Model (COM) object. Commands 115, target visual resources 120, and source visual resources 110 are communicated via these COM objects to the visual resource analyzer 130. The visual resource analyzer 130 then performs the desired tests indicated by the commands 115, and sends the results 145 via COM objects to the editor subsystem 210 which displays the results to the user. COM objects and interfaces are described in "COM", Microsoft Developer Network Library Edition—October 1997, Microsoft Corporation (1997), which is hereby incorporated by reference. In other embodiments, message passing or other communication mechanisms could be used instead of COM objects. In addition, all or some of the functions of software localization system 200 (i.e., the visual resource analyzer 130, editor subsystem 210, and parser subsystem 220) could be placed within a single application which would possibly eliminate the need for such a communications mechanism.

Figure 4:
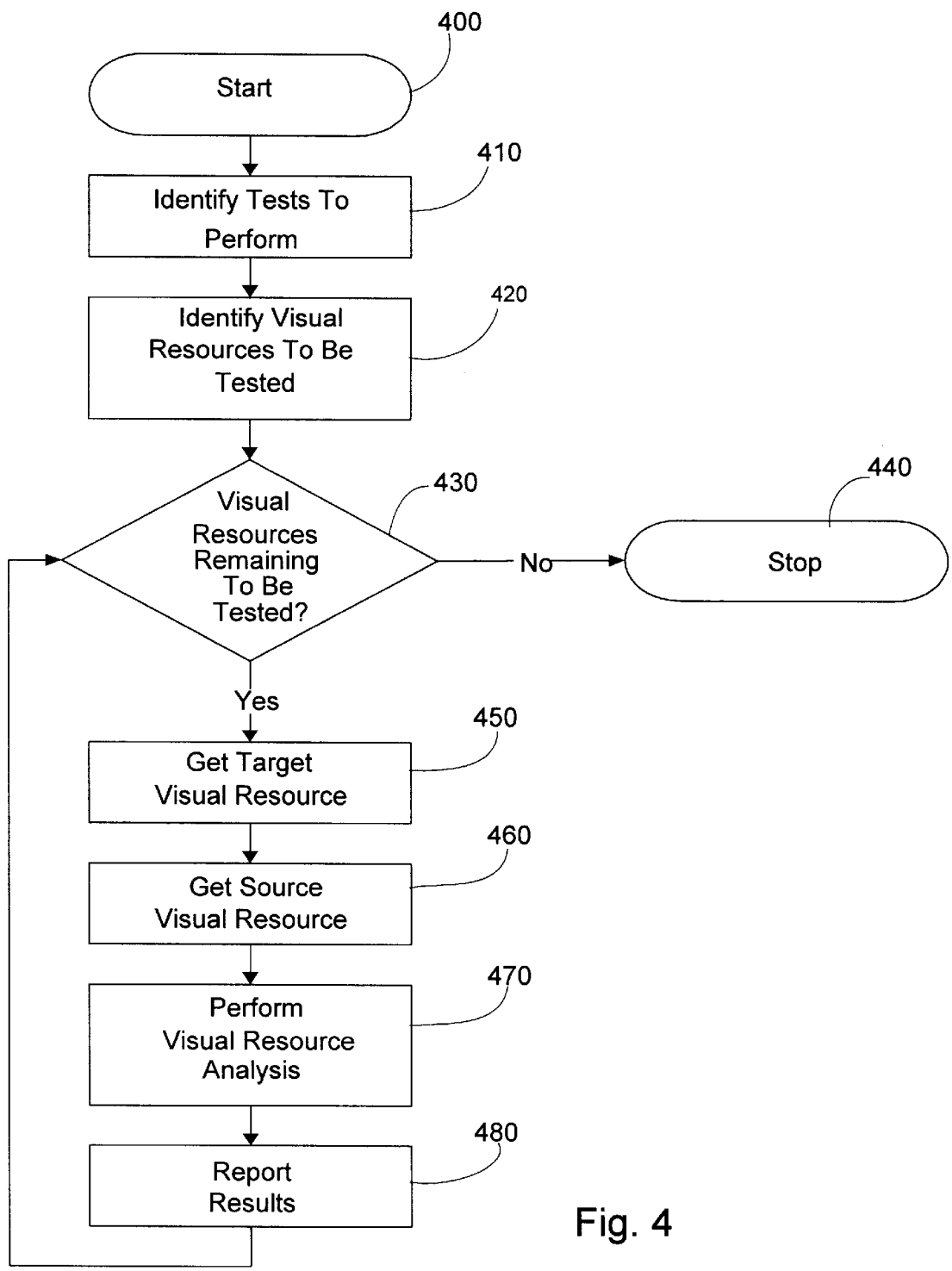
FIG. 4 is a high-level flow diagram describing the steps performed by the visual resource analyzer to analyze visual resources in accordance with one embodiment of the present invention described herein.

Turning now to FIG. 4, shown is a high-level flow diagram describing the process performed by the visual resource analyzer. First, in steps 410 and 420, the tests to be performed and the visual resources to be tested are identified. Next, while there are visual resources remaining to be tested as determined in step 430, a target visual resource is acquired in step 450 and a source visual resource is acquired in step 460. Next, in step 470, the specified tests are performed by the visual resource analyzer 130, with the diagnostic output 140 being reported in step 480.

Figure 5:
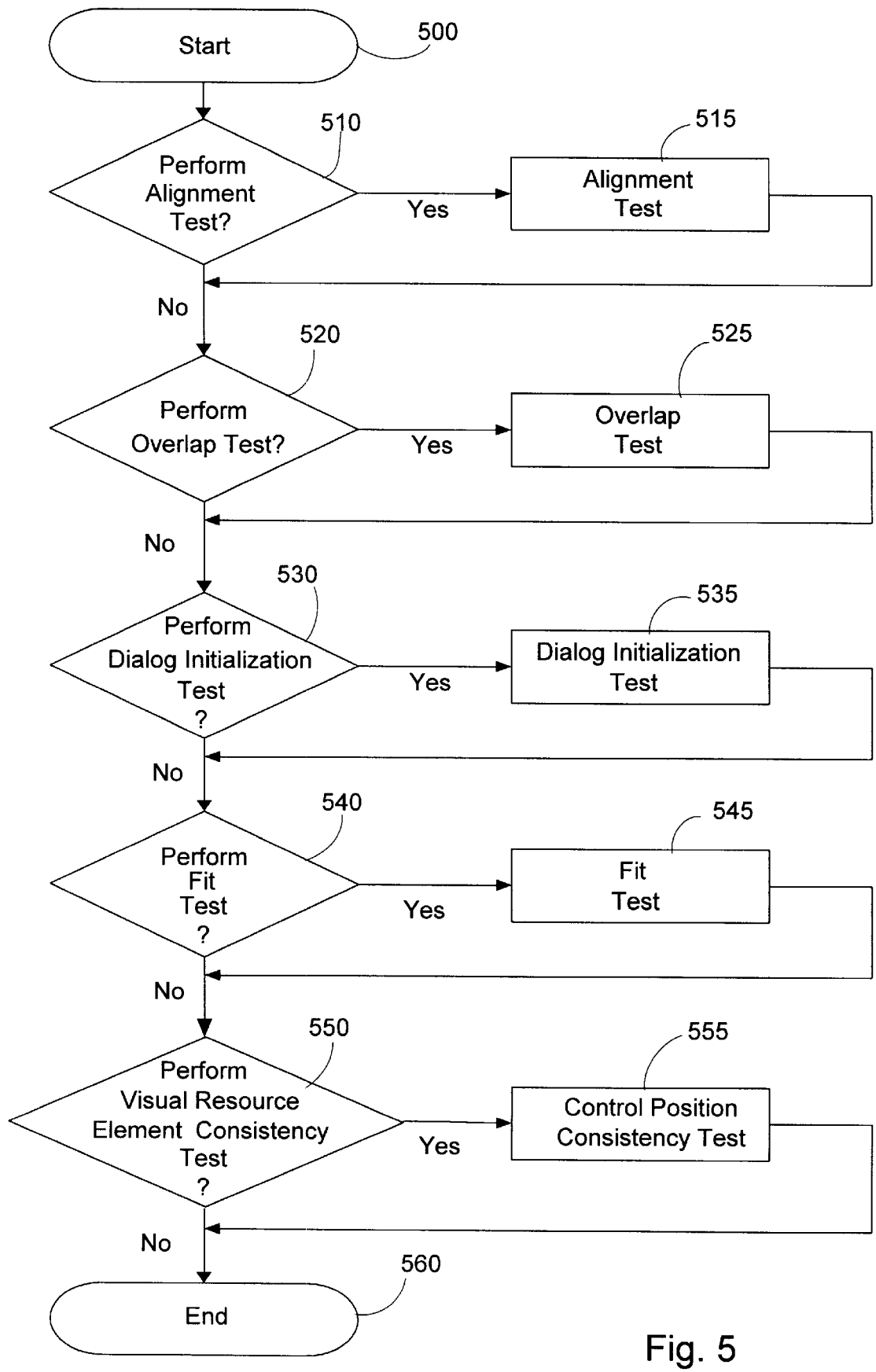
FIG. 5 is a flow diagram illustrating the framework for executing various tests to be performed on the localized visual resource elements.

FIG. 5 provides a flow diagram for performing the visual resource analyzer tests of step 470 in FIG. 4. This flow diagram illustrates a conventional case statement, with one entry for each possible test. Illustrated are five tests which could be performed: alignment test (step 515), overlap test (step 525), dialog initialization test (step 535), fit test (step 545), and visual resource element consistency test (step 555). These five tests are described in FIGS. 6A–E, where exemplary pseudo code is presented. As evident to one skilled in the art, these five tests are only an illustrative subset of tests which could be performed by the visual resource analyzer 130 within the visual resource analyzer framework 100 in accordance with the invention.

The alignment test of step 515 is described in FIG. 6A in which the horizontal (X) and vertical (Y) position of each visual resource element $VRE_1$ of the target visual resource is compared with the other visual resource elements $VRE_2$. If the relative horizontal positions of $VRE_1$ and $VRE_2$ are not equal but are within some small predetermined delta amount ($\Delta x$), then a potential alignment error has been detected. Similarly, the relative vertical positions of $VRE_1$ and $VRE_2$ are compared, and if they are not equal but within some small predetermined delta amount ($\Delta y$), then a potential alignment error has been detected.

The overlap test of step 525 is described in FIG. 6B, in which the size and position of each visual resource element $VRE_1$ of the target visual resource is compared with those of the other visual resource elements VRE$_2$ of the target visual resource. If any VRE$_1$ and VRE$_2$ overlap, an overlap error has been detected.

The dialog initialization test of step 535 is described in FIG. 6C. Certain dynamic visual resources such as dialogs do not acquire the text of strings to be displayed until runtime. Therefore, exhaustive testing is not available without executing the target application. However, listbox controls and combo box controls may contain lists of strings to be initially viewed in the control. These strings are stored in a dialog initialization resource. It is possible to compare the number of elements in the source initialization resource with that of the target initialization resource. If they are not the same, then an error has been detected.

The fit test of step 545 is described in FIG. 6D, in which text strings are tested to ensure they will be fully displayed in the allotted display space available in the target visual resource. As described, the display size of the text string is determined by a function call to the operating system, which provides the required display space requirements based on the font type, font size and text of the string. If the returned display size exceeds the space allotted in the target visual resource, then a fit error has been detected.

Finally, the visual resource element consistency test of step 555 is described in FIG. 6E, in which each visual resource element in the target visual resource is compared with the corresponding visual resource element in the source visual resource. Any differences in display characteristics (e.g., size, position) are determined and recorded. For example, each control in a target dialog (CDialogItemTemplates object) is compared with the corresponding control in the source dialog.

After the visual resource analysis has been performed as indicated in steps 510–555 of FIG. 5 (corresponding to step 470 of FIG. 4), processing continues in step 480 of FIG. 4 whereby the Results 145 of the Visual Resource Analyzer 130 are sent to a diagnostic output device 140 or a calling routine or process, such as the editor subsystem 210 of the software localization system 200. Next, returning to step 430, if there are no more visual resources to be tested, then the visual resource analyzer is done as indicated in step 440, else more visual resources are tested as described herein.

In view of the many possible embodiments to which the principles of our invention may be applied, it should be recognized that the embodiment described herein with respect to the drawing figures is only illustrative and should not be taken as limiting the scope of the invention. To the contrary, the invention as described herein contemplates all such embodiments as may come within the scope of the following claims and equivalents thereof.

What is claimed is:

1. In a computer system, a method for facilitating detection and correction of visual display errors arising from translating a source visual resource to a target visual resource, the method comprising the steps of:
   providing a set of visual resource tests that may be performed with reference to at least the target visual resource;
   non-visually comparing display properties, including size and position, of the target visual resource to display properties of the source visual resource for differences in accordance with at least one of the set of visual resource tests; and
   recording differences between the target visual resource and the source visual resource detected during the non-visually comparing step.

2. The method of claim 1, further comprising the step of storing the display properties of the target and source visual resources within an internal data structure; and wherein the non-visually comparing display properties step includes comparing the display properties of the target and source visual resource stored within the internal data structure.

3. The method of claim 2, wherein the comparing step includes performing a visual resource element consistency test.

4. The method of claim 3, further comprising the steps of: extracting the target visual resource from a target application file; and extracting the source visual resource from a source application file.

5. The method of claim 1, wherein the target visual resource contains a plurality of target visual resource elements and the source visual resource contains a plurality of source visual resource elements; and the comparing step includes comparing the display properties of the plurality of target visual resource elements to display properties of the plurality of source visual resource elements for visual errors.

6. The method of claim 5, wherein the source and target visual resource elements include controls.

7. The method of claim 5, wherein the source and target visual resource elements include strings of text.

8. The method of claim 1, further comprising the steps of: extracting the target visual resource from a target application file; and extracting the source visual resource from a source application file.

9. The method of claim 1 wherein the target visual resource includes translated text of the source visual resource.

10. A computer-readable medium having computer-executable instructions for detecting visual display Property inconsistencies between a target visual resource and a source visual resource by performing, in a computer system the steps of:
    storing display properties of the target and source visual resources within an internal data structure;
    extracting the target visual resource from a target application file;
    extracting the source visual resource from a source application file;
    non-visually comparing display properties, including size and position, of the target visual resource to display properties of the source visual resource for differences; and
    producing a list of differences between the target visual resource and the source visual resource.

11. A computer-readable medium having computer-executable instructions for detecting visual display property inconsistencies between a target visual resource and a source visual resource by performing, in a computer system, the steps of: non-visually comparing display properties, including size and position, of the target visual resource to display properties of the source visual resource for differences; and producing a list of differences between the target visual resource and the source visual resource.

12. In a computer system, a method for facilitating non-visually determining display anomalies within a target visual resource, the target visual resource resulting from translation of displayed text from a source visual resource and having a plurality of visual resource elements, the method comprising the steps of:
    providing a set of visual resource test that may be performed with reference to at least the target visual resource;
    selecting a first visual resource element from the plurality of visual resource elements;
    selecting a second visual resource element from the plurality of visual resource elements; and
    non-visually comparing display properties of the first visual resource element with display properties of the second visual resource element in accordance with at least one of the set of visual resource tests to determine display anomalies.

13. The method of claim 12, further comprising the step of storing the display properties of the first and second visual resource elements within an internal data structure; and wherein the non-visually comparing properties step includes comparing the display properties of target and source visual resource elements stored within the internal data structure.

14. The method of claim 13, wherein the display properties include size and position.

15. The method of claim 13, wherein the source and target visual resource elements include controls and strings of text.

16. The method of claim 13, wherein the comparing step includes checking for alignment errors.

17. The method of claim 13, wherein the comparing step includes checking for overlap errors.

18. The method of claim 13, wherein the first visual resource element has a string comprising text, a font type, and a font size; and the comparing step further comprises determining whether the string will be fully displayed within the first visual resource element.

19. The method of claim 13, further comprising the step of extracting the visual resource from a file containing an executable application.

20. The method of claim 19, wherein the comparing step includes performing an alignment test, an overlap test, a dialog initialization test, or a fit test.

21. A computer-readable medium having computer-executable instructions for facilitating non-visually determining display anomalies within a target visual resource, the target visual resource resulting from translation of displayed text from a source visual resource and having a plurality of visual resource elements by performing, in a computer system, the steps of:

providing a set of visual resource tests that may be performed with reference to at least the target visual resource;

storing the display properties of the source visual resource and target visual resource elements within at least one internal data structure;

extracting the target visual resource from a file containing an executable application;

selecting a first visual resource element from the plurality of visual resource elements;

selecting a second visual resource element from the plurality of visual resource elements;

first non-visually comparing display properties of the first visual resource element with display properties of the second visual resource element to determine display anomalies, wherein the non-visually comparing display properties step includes performing at least one of the set of visual resource tests including an alignment test, an overlap test, a dialog initialization test and a fit test; and second non-visually comparing display properties of target and source visual resource elements stored within the internal data structure.

22. A computer-readable medium having computer-executable instructions for facilitating non-visually determining display anomalies within a target visual resource, the target visual resource resulting from translation of displayed text from a source visual resource and having a plurality of visual resource elements by performing, in a computer system, the steps of:

providing a set of visual resource tests that may be performed with reference to at least the target visual resource;

selecting a first visual resource element from the plurality of visual resource elements;

selecting a second visual resource element from the plurality of visual resource elements; and non-visually comparing display properties of the first visual resource element with display properties of the second visual resource element in accordance with at least one of the set of visual resource tests to determine display anomalies.

23. In a computer system, a framework for non-visually, statically analyzing a target visual resource for display errors without executing a target application containing the target visual resource, the framework comprising: a storage device containing the target application and a source application;

a parser for extracting the target visual resource from the target application and a source visual resource from the source application;

a command interface for receiving commands identifying a visual resource test to be performed;

a result interface for indicating results of the test; and a visual resource analyzer for performing the identified visual resource test on the target visual resource with reference to the source visual resource.

24. The framework of claim 23, wherein the identified visual resource test performed by the visual resource analyzer is a visual resource element consistency test.

25. The framework of claim 24, wherein the target and source visual resources are dialogs.

26. The framework of claim 23, wherein the identified visual resource test performed by the visual resource analyzer is one of a set of available tests, selectable via the command interface, including: an alignment test, an overlap test, a dialog initialization test, a fit test, and a visual resource element consistency test.

27. The computer system of claim 23, further comprising a display device and an input device, wherein the result interface comprises the display device, and the command interface comprises the input device.

* * * * *

UNITED STATES PATENT AND TRADEMARK OFFICE
CERTIFICATE OF CORRECTION

PATENT NO.  : 6,151,022
DATED       : November 21, 2000
INVENTOR(S) : Alshibani et al.

It is certified that error appears in the above-identified patent and that said Letters Patent is hereby corrected as shown below:

Column 8,
Line 28, delete the word "detecting".
Line 28, insert before the word "visual", -- facilitating detection and correction of --.
Line 28, "Property" should be -- property --.
Line 29, delete "inconsistencies between" and insert
-- errors arising from converting a source visual resource to --
Line 42, delete "producing a list of and insert -- recording --.
Line 43, after "resource" but before the period, insert
-- detected during the non-visually comparing step --
Line 45, delete "detecting".
Line 45, insert before the word "visual" -- facilitating detection and correction of --.
Line 46, delete "inconsistencies between" and insert
-- errors arising from converting a source visual resource to --.
Lines 46-47, delete "and a source visual resource"
Line 51, delete "producing a list of and insert -- recording --.
Line 52, after "visual resource" but before the period, insert
-- detected during the non-visually comparing step --.
Line 59, "test" should be -- tests --.

Column 9,
Line 7, delete "wherein the non-visually comparing properties step includes" and insert -- second non-visually comparing display properties --.
Line 8, delete "comparing the display properties of target and source visual" and insert -- of the target visual resource and source visual --.
Line 9, delete "elements stored within the internal data structure".
Line 11, after "ties" and before "include", insert
-- of the target and source visual resources referenced during the second non-visually comparing step --.
Line 13, "13" should be -- 12 --.
Line 13, after "wherein the", insert -- non-visually --.
Line 16, "13" should be -- 12 --.
Line 16, after "wherein the", insert -- non-visually --.

UNITED STATES PATENT AND TRADEMARK OFFICE
CERTIFICATE OF CORRECTION

PATENT NO.   : 6,151,022
DATED        : November 21, 2000
INVENTOR(S)  : Alshibani et al.

It is certified that error appears in the above-identified patent and that said Letters Patent is hereby corrected as shown below:

<u>Column 9, cont'd,</u>
Line 18, "13" should be -- 12 --.
Line 18, "first" should be -- target --.
Line 19, delete "element".
Line 19, after "has" insert -- a display box including --.
Line 21, delete "first visual resource element" and insert -- display box --.
Line 22, "13" should be -- 12 --.
Line 23, insert after "the" and before "visual" -- target --.

Signed and Sealed this

Second Day of September, 2003

JAMES E. ROGAN
*Director of the United States Patent and Trademark Office*